United States Patent [19]
Buzbee

[11] Patent Number: 5,815,720
[45] Date of Patent: Sep. 29, 1998

[54] USE OF DYNAMIC TRANSLATION TO COLLECT AND EXPLOIT RUN-TIME INFORMATION IN AN OPTIMIZING COMPILATION SYSTEM

[75] Inventor: William B. Buzbee, Half Moon Bay, Calif.

[73] Assignee: Institute for the Development of Emerging Architectures, L.L.C., Palo Alto, Calif.

[21] Appl. No.: 616,608

[22] Filed: Mar. 15, 1996

[51] Int. Cl.[6] ....................................................... G06F 9/45
[52] U.S. Cl. ........................... 395/709; 395/705; 395/707; 395/708; 395/710
[58] Field of Search .................................. 395/705, 707, 395/708–710

[56] References Cited

U.S. PATENT DOCUMENTS

| | | | |
|---|---|---|---|
| 5,375,242 | 12/1994 | Rajiv et al. | 395/707 |
| 5,471,564 | 11/1995 | Dennis et al. | 395/114 |
| 5,475,842 | 12/1995 | Gilbert et al. | 395/706 |
| 5,481,708 | 1/1996 | Kukol | 395/709 |
| 5,519,866 | 5/1996 | Lawrence et al. | 395/710 |
| 5,535,391 | 7/1996 | Hejilsberg et al. | 395/709 |
| 5,586,329 | 12/1996 | Knudsen et al. | 395/702 |
| 5,586,330 | 12/1996 | Knudsen et al. | 395/705 |
| 5,590,331 | 12/1996 | Lewis et al. | 395/708 |
| 5,594,899 | 1/1997 | Knudsen et al. | 707/2 |
| 5,596,752 | 1/1997 | Knudsen et al. | 395/701 |

OTHER PUBLICATIONS

Eggers, et al. "Techniques for efficient inline tracing on a shared–memory multiprocessor", ACM sigmetrics conf. on measurement and modeling of computer systems proceedings, vol. 18, No. 1, pp. 37–47, May 1990.

Stunkel, et al. "TRAPEDS: Producing traces for multicomputers via execution driven simulation", ACM press –Performance Evaluation Review vol.17, No.1, pp. 70–78, May 1989.

Cathy May, "Mimic: A fast system /370 simulator", ACM Press –SIGPLAN '87 Symposium on Interpreters and Interpretive Techniques, pp. 1–13. SIGPLAN NOTICES, vol.22, No.7, Jul. 1987.

Chow, et al. "Engineering a RISC compiler system", IEEE COMPCON, pp. 132–137, May 1986.

"PA–RISC 1.1 Architecture and Instruction Set Manual", Hewlett Packard, HP Part No. 09740–09939, Feb. 1994, pp. 5–138.

R. Cmelik, D. Keppel "Shade: A Fast Instruction–Set Simulator for Execution Profiling", 1994 ACM Sigmetrics Conference, 1994.

R. Cmelik, D. Keppel "Shade: A Fast Instruction–Set Simulator for Execution Profiling", Technical Report UWCSE 93–06–06, 1993.

T. Halfhill, "Emulation: RISC's Secret Weapon" BYTE Apr. 1994, pp. 119, 120, 122, 124, 126, 128, 130.

*Primary Examiner*—Emanuel Todd Voeltz
*Assistant Examiner*—Cuong H. Nguyen

[57] ABSTRACT

Dynamic translation is used to produce profile information used to optimize object code for an application. In order to produce optimized object code for the application, source code for the application is compiled to produce first object code for the application. The first object code is used in the generation of profile information about the application. This is done by dynamically translating the first object code to produce second object code. The second object code includes profiling code which, when executed, produces the profile information. The second object code is executed to produce the profile information. The source code for the application is recompiled to produce the optimized object code. The recompiling includes using the profile information in the production of the optimized object code.

19 Claims, 6 Drawing Sheets

USE OF DYNAMIC TRANSLATION TO COLLECT AND EXPLOIT RUN-TIME INFORMATION IN AN OPTIMIZING COMPILATION SYSTEM

BACKGROUND

The present invention concerns compiler optimization and pertains particularly to the use of dynamic translation to collect and exploit run-time information in an optimizing compilation system.

Programs are generally written in a high level programming language. This high level language, often referred to as source code, is translated by a compiler program into an assembly language. The binary form of the assembly language, called object code, is the form of the code actually executed by a computer. The object code is generally first produced in object code modules which are linked together by a linker. For the purpose of the present application, the term "compile" includes both the process of producing the object code modules and linking the object code modules together.

In order to increase performance of object code when executed by a target computer, compiled code is frequently optimized. The object code may be optimized in several different ways.

One type of optimization is a profile-based optimization (PBO). In a PBO, the compiler optimizes an application based on profile data obtained from running the application on a typical input data set. For example, if certain procedures call each other frequently, the linker can place them close together in the object code file, resulting in fewer instruction cache misses, translation lookaside buffer (TLB) misses, and memory fault pages when the application is run.

Similar optimizations can be done at the basic block levels of a procedure. A basic block is a contiguous section of assembly code, produced by compilation, that has no branches in except at the top, and no branches out except at the bottom. Profile data is also used by the compiler for other general tasks, such as code scheduling and register allocation.

In order to perform PBO, source code for an application is compiled using a special compiler option which instruments the object code by inserting special profiling code. The special profiling code, when the application is executed, will produce profile data. The profile data is collected. When the source code for the application is recompiled, the profile data is used to better optimize the new compilation of the application source code. For a discussion on PBO, see, for example, Programming on HP-UX, HP 9000 Series 700/800 Computers, available as HP Part No. B2355-90652, from Hewlett-Packard Company, having a business address of 3000 Hanover Street, Palo Alto, Calif. 94304, January 1995, pp. 8-1 through 8-17.

One problem with the use of PBO is that it requires a separate compile to perform. Thus, when a user wishes to utilize PBO it is typically necessary to compile the application source code three times. The first time is to produce a copy of the application used to test and validate the application. In a second compilation of the code, special profiling code is added to produce the profile data. A third compilation is then necessary which builds the application using the generated profile data to optimize the compiled application.

SUMMARY OF THE INVENTION

In accordance with the preferred embodiment of the present invention, dynamic translation is used to produce profile information used to optimize object code for an application. In order to produce optimized object code for the application, source code for the application is compiled to produce first object code for the application. The first object code may be used to test and validate the application.

The first object code is also used in the generation of profile information about the application. This is done by dynamically translating the first object code to produce second object code. The second object code includes profiling code which, when executed, produces the profile information. The second object code is executed to produce the profile information. The source code for the application is then recompiled to produce the optimized object code. The recompiling includes using the profile information in the production of the optimized object code.

This process may be repeated to generate additional profile information about the optimized object code to further optimize object code for the application.

In an alternate embodiment of the present invention, annotations are placed into the first object code. The translator utilizes the annotations within the first object code to determine the particular profiling code to be placed within the second object code and thus to determine the profile information which will be generated. The annotations are placed into the first object code by a compiler. Alternately, or in addition, a user can be granted access to annotations within the object code and the generated profile information which results from executing the object code. Based on this information, the user can add to or change the annotations within the object code to help direct the optimization process. This may be done as an iterative process until no further optimizations can be found, or until the performance of the optimized application is satisfactory to the user.

The present invention has significant advantages over the prior art. Particularly, the present invention allows for a profile based optimization without the requirement that a separate compile be performed to produce a special version of object code instrumented with profiling code. Using a dynamic translator to produce the profile data simplifies a developer's use of PBO. Additionally, a dynamic translation system is easily adaptable to dynamic data gathering and facilitates using annotations in an iterative approach to PBO. This allows for more efficient and extensive run-time profile data gathering.

DESCRIPTION OF THE PREFERRED EMBODIMENT

Figure 1:
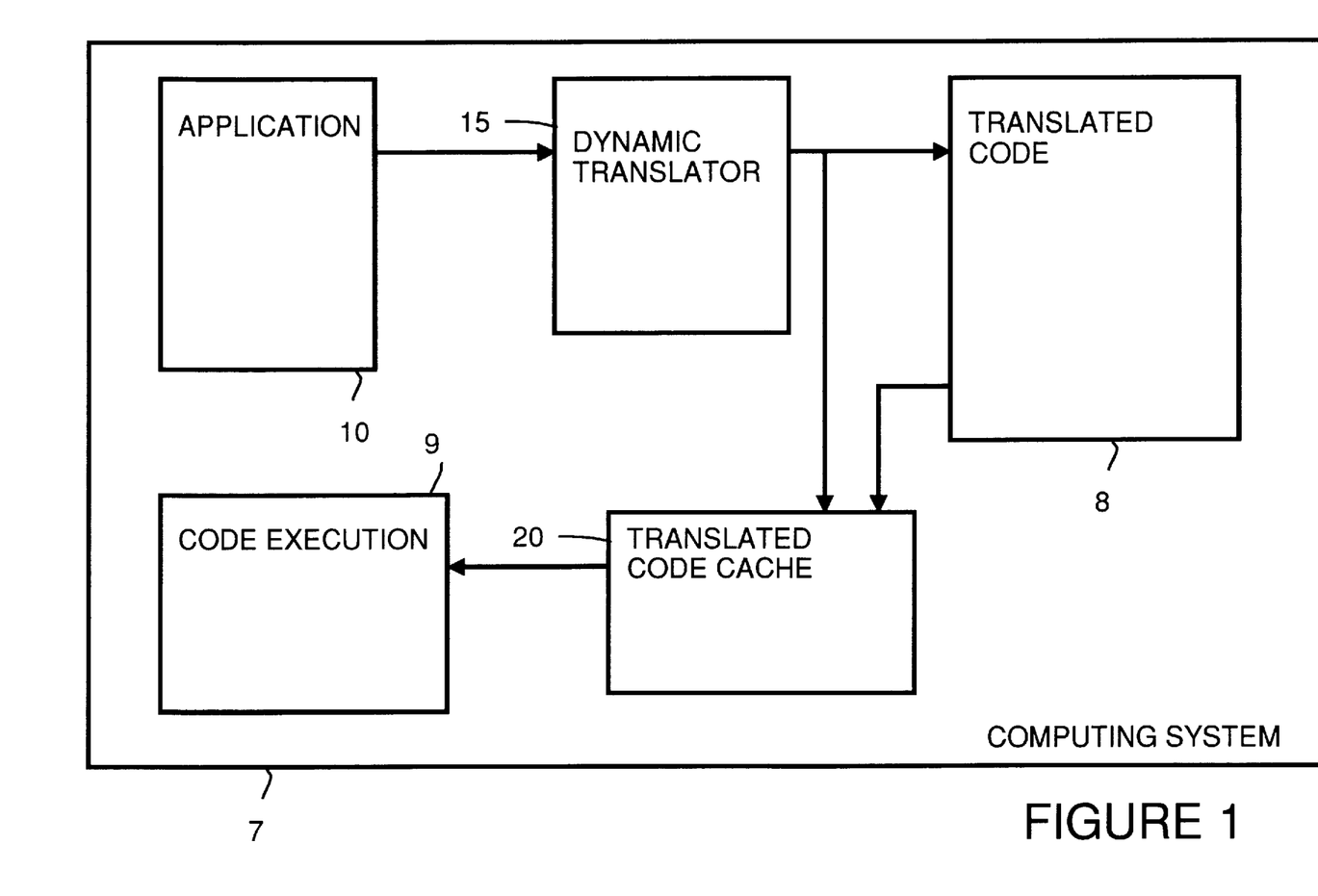
FIG. 1 is a simplified block diagram which shows a computing system which includes a dynamic translator in accordance with the preferred embodiment of the present invention.

FIG. 1 shows a simplified block diagram of a computing system 7 which uses a dynamic translator 15 to execute an application 10. Dynamic translator 15 differs from a compiler in that a compiler produces executable code before runtime. Dynamic translator 15 produces translated code 8 during runtime. Blocks of code from application 10 are translated at execution time. The translated blocks of code are shown in FIG. 1 as translated code 8. Translated code 8 is stored in memory (e.g., cache memory) so that each block of code which is executed a number of times need be translated only once during runtime. This approach allows the flexibility of not requiring that code be translated before runtime, but reduces the overhead that would result if a block of code were translated every time it was executed.

In the preferred embodiment, translated code 8 is stored in a translated code cache 20. When translated code cache 20 is full, it may be necessary to discard some previously translated blocks of code in order to make room for newly translated blocks of code. This will require the blocks of code which were discarded to be retranslated if they are used again, but does allow for potential savings in memory usage. Alternately, rather than discarding previously translated blocks of code, they can be stored in system memory.

Figure 2:
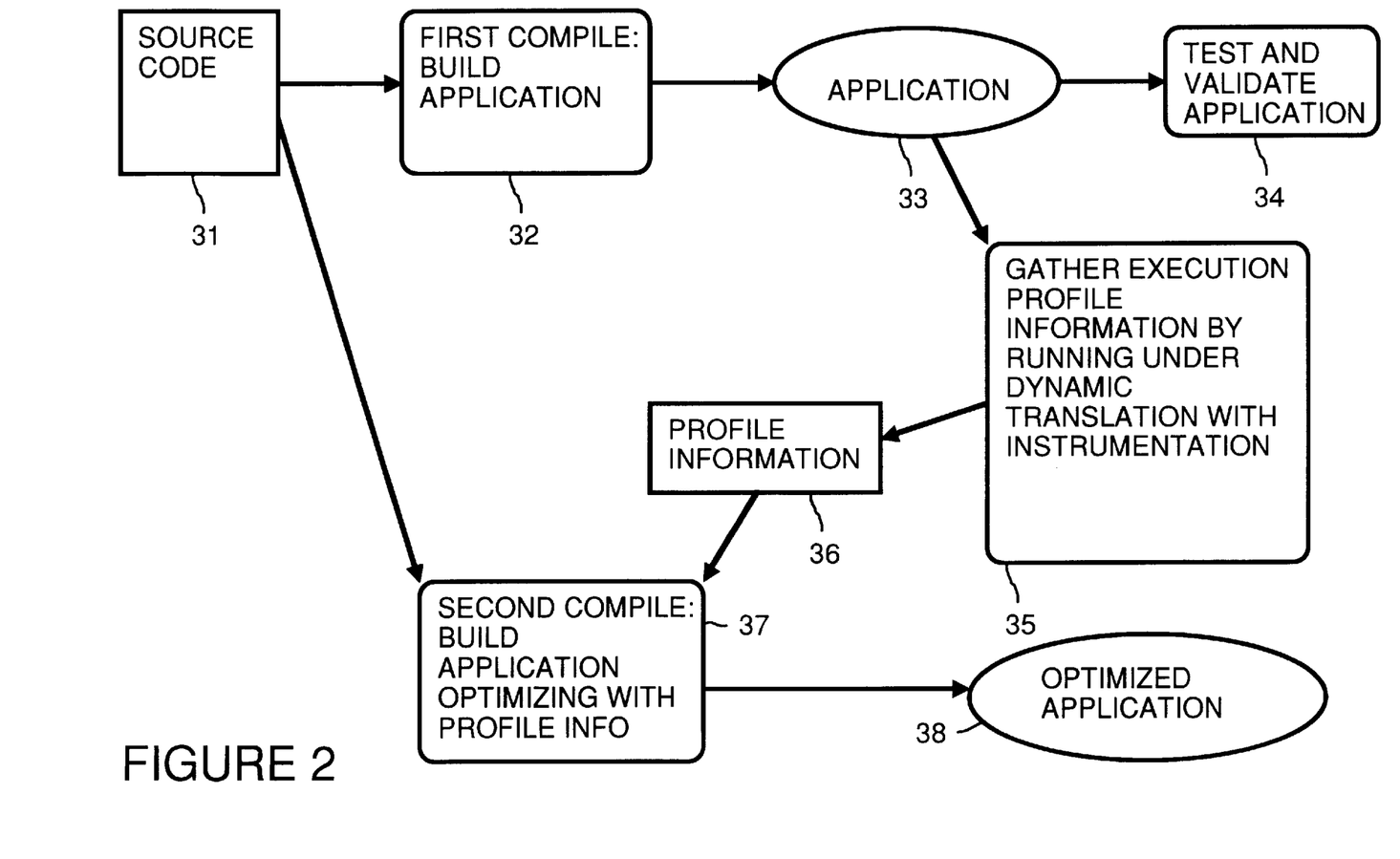
FIG. 2 shows a flow diagram for a system which utilizes a dynamic translator to produce profile data in accordance with the preferred embodiment of the present invention.

FIG. 2 shows a flow diagram for a system which utilizes a dynamic translator to produce profile data in accordance with the preferred embodiment of the present invention. Source code 31 is compiled in a step 32 to produce an application 33. Compiled application 33 may be tested and validated in a step 34. Since at compiler time, no profiling code was added to compiled application 33, application 33 may be operated at full speed during testing and validation. Performance of application 33 is not hindered by inclusion of profiling code within application 33 because no profiling code is added to application 33 during compile time.

In order to gather profile information, application 33 is run, in a step 35, under a translator. The translator performs object code to object code translation. That is, the object code of application 33 is translated by the translator into translated object code. The translated object code is then executed. The difference between the translated object code produced in step 35 and the object code compiled in step 32 to produce application 33 is that profiling code is added to the translated object code produced in step 35. In other words, the translated object code produced in step 35 may be identical or substantially similar to the object code compiled in step 32 to produce application 33, with the exception that the translated object code produced in step 35 additionally includes profiling code which is used to produce profile information 36 when the translated object code is executed.

In a step 37, profile information 36 is used during a second compile to produce an optimized application 38. In effect, a profile based optimization (PBO) is performed with the application source code being compiled only two times. The first time is to produce a source code copy of the application used to test and validate the application. The same copy of the application used to test and validate the application is run under translation to produce profile data. A second compilation is then performed which builds the application using the profile data to further optimize the compiled application.

Figure 3:
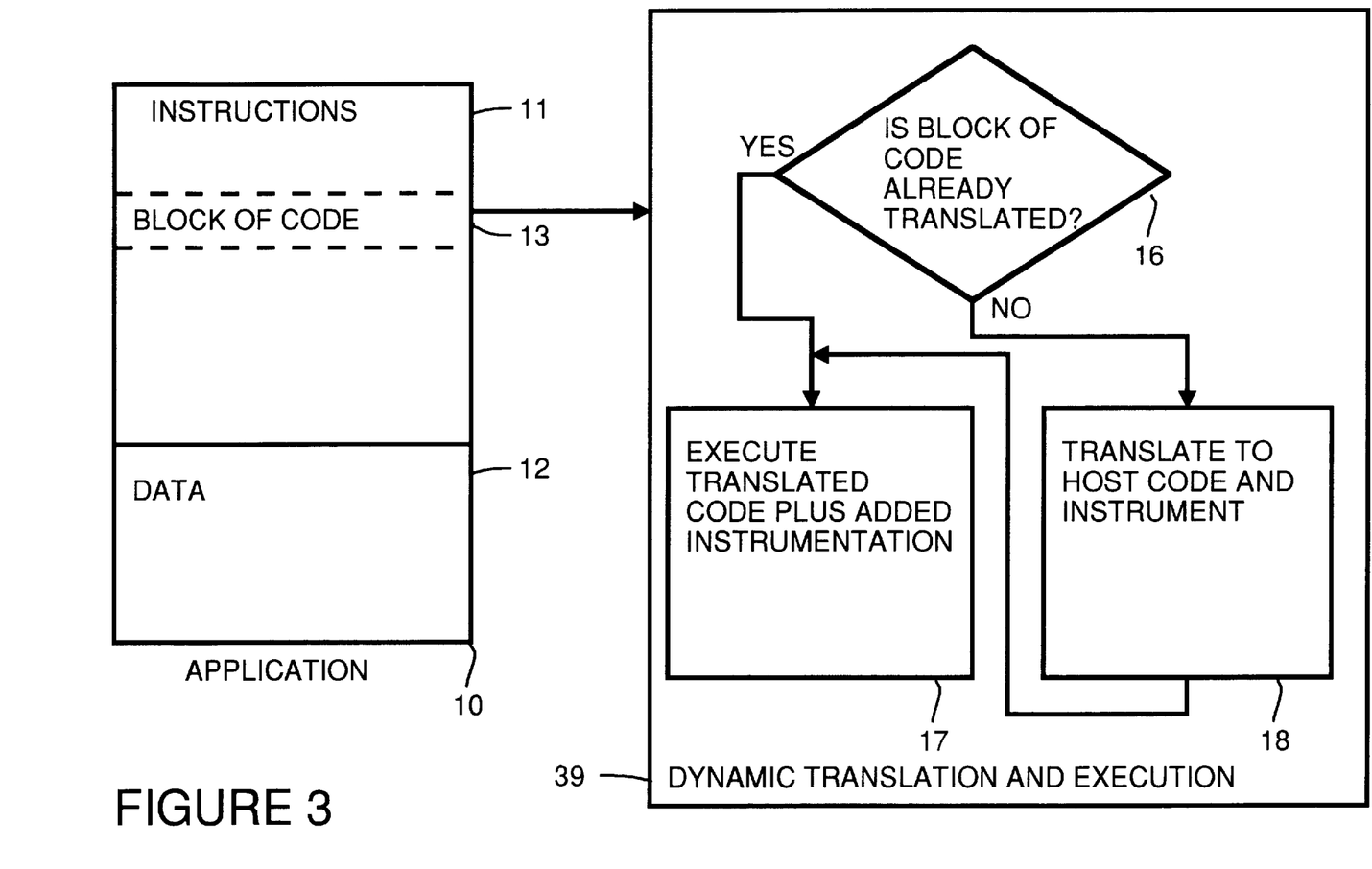
FIG. 3 illustrates use of a dynamic translator to dynamically translate code in accordance with the preferred embodiment of the present invention.

FIG. 3 illustrates use of a dynamic translation and execution process 39 to dynamically translate and execute code from application 10. The translation produces translated object code with profiling code. Application 10 is shown to include instructions 11 and data 12. As instructions 11 within application 10 are executed, whenever a program counter points to a new block of code 13 within application 10, in a step 16, it is determined whether the new block of code 13 has been encountered before by dynamic translation and execution process 39 and thus been previously translated. If not, in a step 18 the block of code is translated to object code which is native to the host computer system. In addition, profiling code is added which will produce profile data. As discussed above, the block of code to be translated may already be native to the host computer system so that the translation may be merely object code to object code translation which introduces profiling code to the translated object code. In a step 17, the translated code for block of code 13 is executed.

Figure 4:
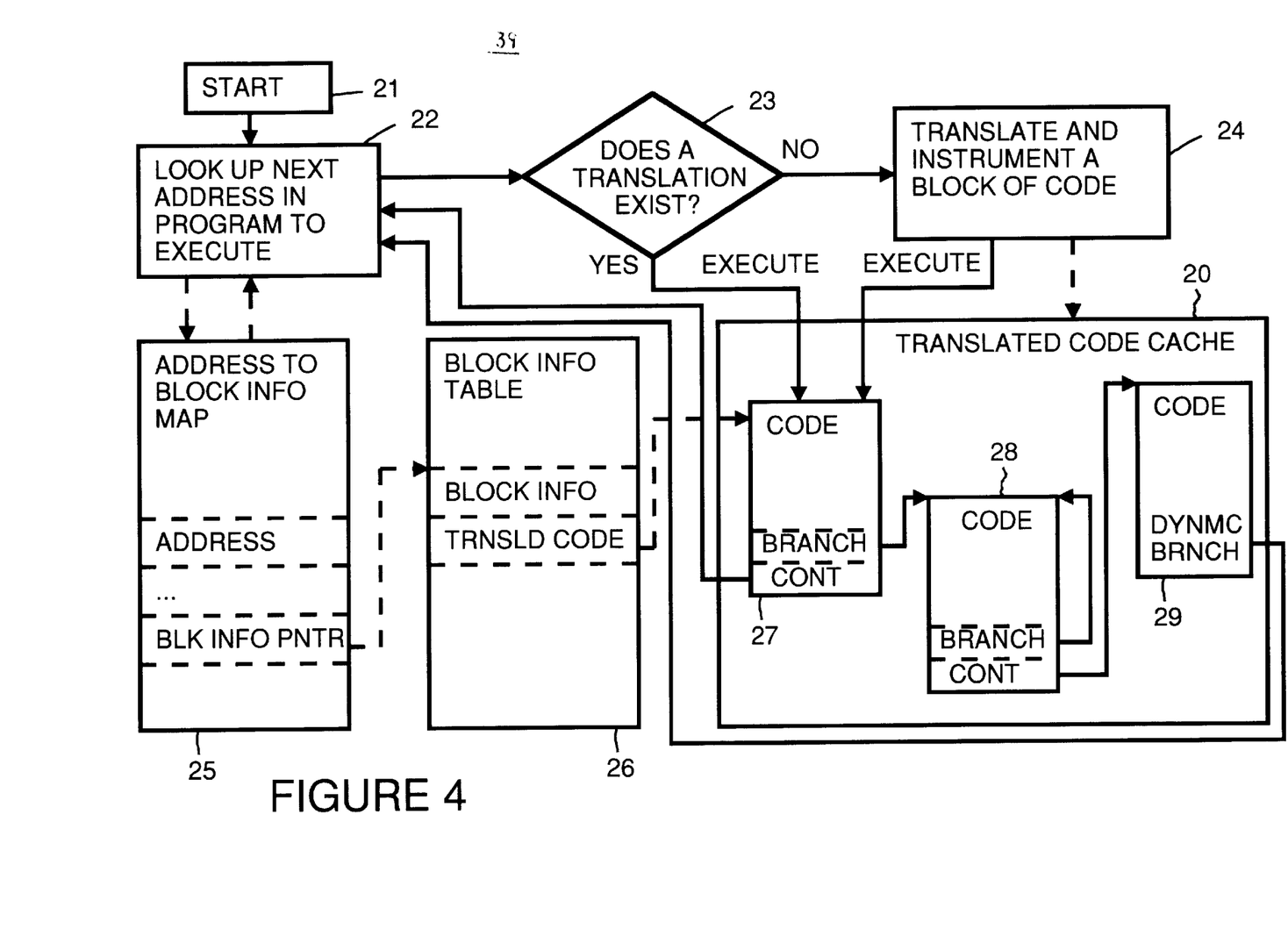
FIG. 4 shows an address to block information map, a block information table, and a translated code cache used by a dynamic translator in accordance with the preferred embodiment of the present invention.

FIG. 4 further illustrates the process of executing an application by dynamic translation and execution process 39. In a step 21, execution of the application is started. In a step 22, a next application address to be executed is looked up. This is done, for example, using an address to block information map 25. Address to block information map 25 includes entries blocks of code in the application and additionally may include entries for blocks of code in a shared library called by the application. In the preferred embodiment, only addresses for blocks of code which are actually needed for execution are included within block information map 25. These addresses are added at run-time as the blocks of code are needed.

A block of code is a grouping of one or more instructions. The block of code may thus consist of a single instruction, a straight-line run of instructions terminated by a branch (similar to a "basic block" as used by a compiler), an entire procedure, or some other grouping of instructions. In the preferred embodiments of the present invention, the block of code is the unit of translation utilized by dynamic translator 15. This unit of translation may be, for example, a procedure, a basic block, a page, a cache line, an instruction, or some other grouping of instructions.

Each entry in address to block information map 25 includes at least a first program address which identifies the starting address of a block of code within the application or a block of code within a shared library. In addition, each entry includes a block information pointer which points to a location in a block information table 26 which includes block information about the block of code from the application or shared library. The block information within block information table 26 will include a pointer to translated code if translated code exists for the block of code.

After looking up a next application address to be executed, in a step 23, a determination is made as to whether translated code exists for the block of code from the application or shared library. This is done, for example, from information retrieved from block information table 26. If a translation does not exist for the block of code, in a step 24, the block of code is translated. The translated code is then executed.

Translated code cache 20 is used to hold translated blocks of code for efficient execution. The number of blocks of code held by translated code cache 20 varies, for example, depending on available memory. In FIG. 4, the blocks of code within translated code cache 20 are represented by a code block 27, a code block 28 and a code block 29. Any of these code blocks may represent a translated procedure from a shared library.

Code blocks within translated code cache 20 may branch to other code blocks within translated code cache 20. Thus a branch within code block 27 points to a location within code block 28. Likewise, after executing code in code block 28, flow control of the program will continue to code block 29. As is seen in FIG. 4, after executing code in code block 27, flow control of the program will continue to a code block outside translated code cache 20. Likewise, after executing code in code block 29 a dynamic branch branches to an address within a code block outside translated code cache 20.

Once execution of instructions within a code block within translated code cache 20 has begun, execution of instructions within the code block and other code blocks within translated code cache will continue until an instruction is to be executed which is not within a block of code within translated code cache 20. Upon such a cache miss, program control will return to step 22 where a next application address to be executed is looked up. The appropriate block of code will be translated (if not translated already) and placed in translated code cache 20. Then execution of the application will continue.

Figure 5:
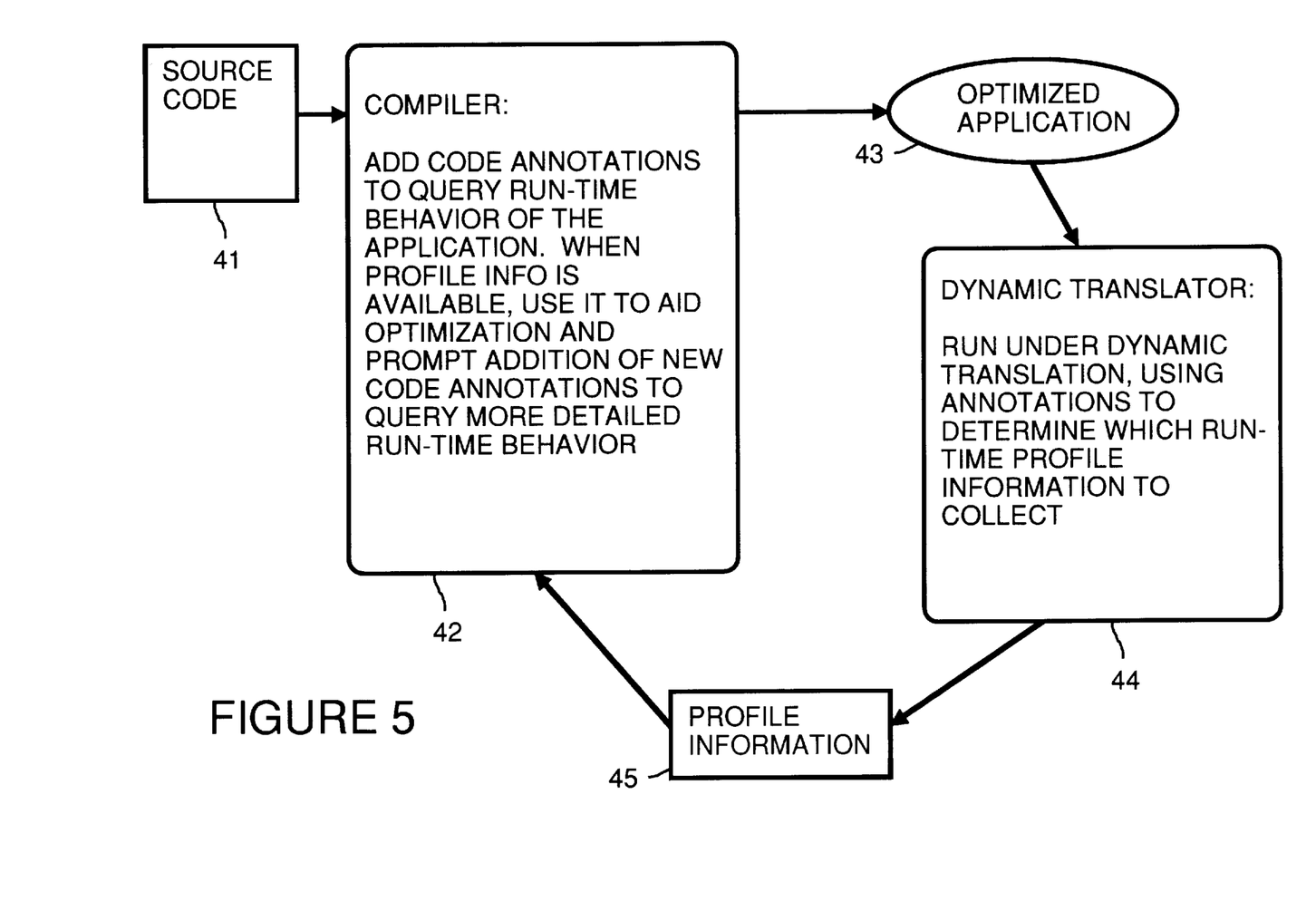
FIG. 5 shows a flow diagram of a system which utilizes a dynamic translator and code annotations to produce profile data in accordance with the preferred embodiment of the present invention.

FIG. 5 shows a flow diagram for a system which utilizes a dynamic translator to produce profile data in accordance with an alternate preferred embodiment of the present invention. Source code 41 is compiled in a step 42 to produce an optimized application 43. During compilation, code annotations are added which query run-time behavior of the optimized application. When profile information is available, it is used to optimize the application. Additionally, the profile information is used to prompt the addition of new code annotations to query more detailed run-time behavior.

In order to gather profile information, application 43 is run, in a step 45, under a translator. The translator performs object code to object code translation. That is, the object code of application 43 is translated by the translator into translated object code. The translated object code is then executed. The translated object code produced in step 44 uses the same machine instruction set as the object code compiled in step 42 to produce application 43. The difference between the translated object code produced in step 44 and the object code compiled in step 42 to produce application 43 is that the annotations in the compiled application is replaced with profiling code which, when executed, will produce profile information 45. The added profiling code is based on the annotations within optimized application 43.

The process may be repeated to further optimize optimized application 43. Profile information 45 gathered from each dynamic translation and execution of optimized application 43 is used to further optimize application 43 at a next compile. The annotations are adjusted on each compilation to obtain additional profile information which will be used in future compilations. This iterative process can continue until no further optimizations to optimized application 43 can be found, or until the performance of optimized application 43 satisfies the developer/tester of optimized application 43.

Figure 6:
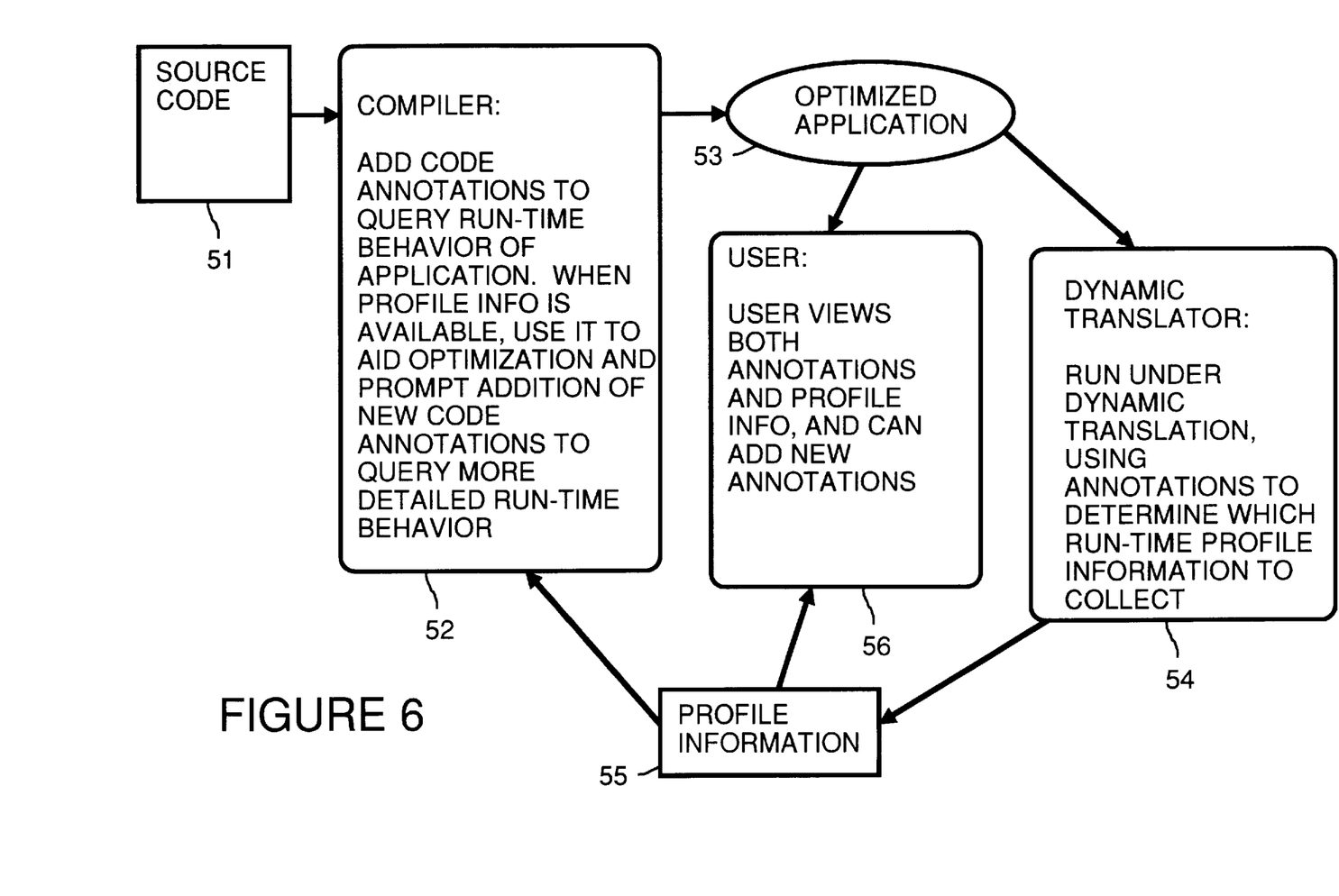
FIG. 6 shows a flow diagram of a system which utilizes a dynamic translator and user revisable code annotations to produce profile data in accordance with the preferred embodiment of the present invention.

FIG. 6 shows a flow diagram for a system which utilizes a dynamic translator to produce profile data in accordance with another alternate preferred embodiment of the present invention. Source code 51 is compiled in a step 52 to produce an optimized application 53. During compilation, code annotations are added which query run-time behavior of the optimized application. When profile information is available, it is used to optimize the application. Additionally, the profile information is used to prompt the addition of new code annotations to query more detailed run-time behavior.

In the embodiment set out in FIG. 6, in a step 56, a user views both annotations and profile information. The user then can add new annotations. This interaction by the user may be performed either before, during or after compile time.

In order to gather profile information, application 53 is run, in a step 55, under a translator. The translator performs object code to object code translation. That is, the object code of application 53 is translated by the translator into translated object code. The translated object code is then executed. The translated object code produced in step 54 uses the same machine instruction set as the object code compiled in step 52 to produce optimized application 53. The difference between the translated object code produced in step 54 and the object code compiled in step 52 to produce optimized application 53 is that the annotations in the compiled application is replaced with profiling code which, when executed, will produce profile information 55. The added profiling code is based on the annotations within optimized application 53.

The process may be repeated to further optimize optimized application 53. Profile information 55 gathered from each dynamic translation and execution of optimized application 53 is used to further optimize application 53 at a next compile. The annotations are adjusted on each compilation to obtain additional profile information which will be used in future compilations. This iterative process can continue until no further optimizations to optimized application 53 can be found, or until the performance of optimized application 53 satisfies the developer/tester of optimized application 53.

The following tables provide sample code which further illustrates operation of the preferred embodiment of the present invention. Table 1 below shows source code for an example procedure in an application.

TABLE 1

| Source Line # | Code |
|---|---|
| 5 | sum = 0 |
| 6 | for (i = 0; i < array_size; i++) |
| 7 | sum + = array [i]; |

Table 2 below shows an example of how the source code in Table 1 looks when compiled into object code.

TABLE 2

| ; Object code for line 5 | |
| --- | --- |
| STW % gr0, sum(DP) | ; Store 0 in sum |
| ; Object code for line 6 | |
| STW % gr0, i(DP) | ; Initialize i to 0 |
| LDW i(DP); % tr1 | ; Load i into a temp |
|  | ; register |
| loop_back | |
| LDW array_size(DP), % tr2 | ; Load array_size into |
|  | ; a temp register |
| COMB, >=, n % tr2, % tr1, exit_loop | ; Exit loop if (i >= |
|  | ; array_size) |
| ; Object code for line 7 | |
| ADDIL array (DP), % tr3 | ; Get address of array |
| LDWX, s, m % tr1, (% tr3), % tr4 | ; Get array [i] |
| LDW sum (DP), % tr5 | ; Get sum |
| ADD % tr4, % tr5, % tr6 | ; Add sum and array |
| [i] | |
| STW % tr6, 0 (% tr3) | ; Store new sum |
| LDO 1 (% tr1), % tr1 | ; i++ |
| B, n loop_back | ; do another iteration |
| exit_loop | |

When the object code in Table 2 is executed under dynamic translation with profiling, dynamic translator 15 adds profiling code to identify the parts of the code which are often executed. Doing this allows the compiler to generate higher quality code. This is done, for example, either by associating counters with the branches (arc counting) or by associating counters with the code representing each line (line frequency profiling). Table 3 below shows the object code in Table 2 with profiling code added by dynamic translator 15 to perform arc counting.

TABLE 3

| | |
|---|---|
| ; Object code for line 5 | |
|    STW % gr0, sum(DP) | ; Store 0 in sum |
| ; Object code for line 6 | |
| ; -profiling code for line 6, part 1 | |
|    LDW Line6Hit(DP), % tr8 | ; Get counter for how<br>; many times the<br>; branch at line 6 was<br>; encountered |
|    ADDI, < > 1, % tr8, % tr8 | ; Increment counter,<br>; nullifying next<br>; instruction if no<br>; overflow |
|    LDI −1, % tr8 | ; Saturate counter if<br>; overflow |
|    STW % tr8, Line6Hit (DP) | ; Store counter back |
|    STW % gr0, i(DP) | ; Initialize i to 0 |
|    LDW i(DP), % tr1 | ; Load i into a temp<br>; register |
| loop_back | |
|    LDW array_size(DP), % tr2 | ; Load array_size into<br>; a temp register |
|    COMB, >=, n % tr2, % tr1, exit_loop | ; Exit loop if (i >=<br>; array_size) |
| ; -profiling code for line 6, part 2 | |
|    LDW Line6NotTaken (DP), % tr8 | ; Get counter for how<br>; many times<br>; the branch at line 6<br>; was encountered |
|    ADDI, < > 1, % tr8, % tr8 | ; Increment counter,<br>; nullifying next<br>; instruction if no<br>; overflow |
|    LDI −1, % tr8 | ; Saturate counter if<br>; overflow |
|    STW % tr8, Line6NotTaken (DP) | ; Store counter back |
| ; Object code for line 7 | |
|    ADDIL array (DP), % tr3 | ; Get address of array |
|    LDWX, s, m % tr1, (% tr3), % tr4 | ; Get array [i] |
|    LDW sum (DP), % tr5 | ; Get sum |
|    ADD % tr4, % tr5, % tr6 | ; Add sum and array<br>; [i] |
|    STW % tr6, 0 (% tr3) | ; Store new sum |
|    LDO 1 (% tr1), % tr1 | ; i++ |
|    B, n loop_back | ; do another iteration |
| exit_loop | |

When the object code in Table 3 is executed, the code keeps track of how many times each statement in the original source was executed. When this information is fed back into the compiler, the compiler may determine that it could use more detailed information about the loop on lines 6 and 7. In that case, it could attach an annotation to the code. This annotation would not actually appear in the object code, but would be included in a non-executable portion of the application file (similar to the symbol table or debugging information).

For example, the compiler might place the annotation, set out in Table 4 below, in the file to request detailed loop information for line 6.

TABLE 4

| Location | Action | Parameters |
|---|---|---|
| <Label_X>: | Loop_Detail: | Iteration_Bound = (array_size − 1) |

The annotation set out in Table 4 consists of three parts: a location, an action, and optional additional parameters needed to carry out the action. The location in this example is a label representing a location in the object code created by the compiler. The action is a code to be interpreted by dynamic translator 15 to gather information whenever the location is encountered during execution. In this example, the action is to gather detail about the loop denoted by Label X such as whether the iteration is usually divisible by 2, 4, or 8, and the "mode" of the loop. In order to carry out the action, dynamic translator 15 needs to know where the iteration bound is located. In the example above, the iteration bound is located in the variable "array_size" and needs to be adjusted by subtracting 1.

Table 5 below gives an example of translated code plus profiling code using annotations. When the this code is executed under dynamic translation, dynamic translator 15 inserts code to do loop detail analysis at Label_X.

TABLE 5

| | |
|---|---|
| ; Object code for line 5 | |
|    STW % gr0, sum(DP) | ; Store 0 in sum |
| ; Object code for line 6 | |
| ; -profiling code for annotation | |
| [<Label_X><Loop_Detail><array_size − 1>] | |
|    LDW array_size(DP), % arg0 | ; Get of loop iteration<br>; bound |
|    BL Analyze_Loop, RP | ; Call analysis<br>; procedure |
|    ADDI −1, % arg0, % arg0 | ; Adjust iteration<br>; bound |
|    STW % gr0, i(DP) | ; Initialize i to 0 |
|    LDW i(DP), % tr1 | ; Load i into a temp<br>; register |
| loop_back | |
|    LDW array_size(DP), % tr2 | ; Load array_size into<br>; a temp register |
|    COMB, >=, n % tr2, % tr1, exit_loop | ; Exit loop if (i >=<br>; array_size) |
| ; Object code for line 7 | |
|    ADDIL array (DP), % tr3 | ; Get address of array |
|    LDWX, s, m % tr1, (% tr3), % tr4 | ; Get array [i] |
|    LDW sum (DP), % tr5 | ; Get sum |
|    ADD % tr4, % tr5, % tr6 | ; Add sum and array<br>; [i] |
|    STW % tr6, 0 (% tr3) | ; Store new sum |
|    LDO 1 (% tr1), % tr1 | ; i++ |
|    B, n loop_back | ; do another iteration |
| exit_loop | |

The example code in Table 3 and Table 5 will cause the generation of profile information when the object code is executed. This information can be made available to the user as well as to the compiler. The user can add new annotations, similar to "Loop_Detail" to request additional information or to supply hints to the compiler to allow the compiler to generate the desired code.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for producing optimized object code for a high level computer language pro ram comprising the steps of:

(a) compiling source code for the high level computer language program to produce first object code;

(b) generating profile information about the first object code, including the following steps (b.1) dynamically translating the first object code to produce second object code, the second object code including profiling code which, when executed, produces the profile information, (b.2) executing the second object code, including producing the profile information; and, (c) recompiling the source code to produce the optimized object code, the recompiling including using the profile information in the production of the optimized object code.

2. A method as in claim 1 additionally including the following step performed after step (a):

(d) testing and validating the first object code.

3. A method as in claim 1 additionally including the following steps performed after step (c):

(d) generating profile information about the optimized object code, including the following steps (d.1) dynamically translating the optimized object code to produce third object code, the third object code including profiling code which, when executed, will produce additional profile information, (d.2) executing the third object code; and, (e) recompiling the source code to produce the further optimized object code, the recompiling including using the additional profile information in the production of the further optimized object code.

4. A method as in claim 1 wherein step (a) includes placing annotations into the first object code.

5. A method as in claim 4 wherein in step (b.1) the annotations within the first object code determine content of the profiling code within the second object code.

6. A method as in claim 5 wherein in step (a) the annotations are placed into the first object code by a compiler which compiles the source code.

7. A method as in claim 5 wherein in step (a) the annotations are placed into the first object code by a user.

8. A method as in claim 5 additionally including the following steps performed after step (c):

(d) generating profile information about the optimized object code, including the following steps (d.1) dynamically translating the optimized object code to produce third object code, the third object code including profiling code which, when executed, will produce additional profile information, (d.2) executing the third object code; and, (e) recompiling the source code to produce the further optimized object code, the recompiling including using the additional profile information in the production of the further optimized object code.

9. A method as in claim 1 wherein the first object code and the second object code utilize a same machine instruction set.

10. A computing system comprising:

a translator which translates first object code of a high-level language program to second object code, the translator including means for adding profiling code to the second object code, the profiling code, when executed, producing profile information; and, executing means for executing the second object code and producing the profile information.

11. A computing system as in claim 10 additionally comprising:

testing and validating means for testing and validating the first object code.

12. A computing system as in claim 10 additionally comprising:

a compiler which compiles source code to generate the first object code.

13. A computing system as in claim 12 wherein the compiler includes:

recompile means for compiling the source code while utilizing the profile information produced by execution of the profiling code, the recompile means producing optimized object code.

14. A computing system as in claim 12 wherein the compiler places annotations into the first object code.

15. A computing system as in claim 14 wherein the translator utilizes the annotations within the first object code to determine content of the profiling code within the second object code.

16. A computing system as in claim 12 wherein the computer system includes means for a user to add and changes annotations into the first object code and wherein the translator utilizes the annotations within the first object code to determine content of the profiling code within the second object code.

17. A computing system as in claim 10 wherein the computing system additionally includes a translated code cache, the translated code cache for storing modules which contain a subset of the second object code.

18. A computing system as in claim 17 wherein the computing system additionally includes:

an address to block information map; and, a block information table.

19. A computing system as in claim 10 wherein the first object code and the second object code utilize a same machine instruction set.

* * * * *

UNITED STATES PATENT AND TRADEMARK OFFICE
CERTIFICATE OF CORRECTION

PATENT NO.    : 5,815,720
DATED         : September 29, 1998
INVENTOR(S)   : Buzbee It is certified that error appears in the above-identified patent and that said Letters Patent is hereby corrected as shown below:

Column 8,
Line 60, delete "pro ram" and insert therefor -- program --

Signed and Sealed this

Eleventh Day of February, 2003

JAMES E. ROGAN
*Director of the United States Patent and Trademark Office*